United States Patent [19]
Smith et al.

[11] Patent Number: 5,855,789
[45] Date of Patent: Jan. 5, 1999

[54] PROCESS FOR REMOVING SELENIUM FROM SELENIUM-CONTAINING WASTE STREAMS

[75] Inventors: Paul K. Smith, Roscoe; Eugene P. Bergemann, Hoffman, both of Ill.

[73] Assignee: NTEC Solutions, Inc., Mt. Prospect, Ill.

[21] Appl. No.: 831,391

[22] Filed: Apr. 1, 1997

[51] Int. Cl.$^6$ .................................................... C02F 1/28
[52] U.S. Cl. ........................ 210/670; 210/681; 210/683; 210/911
[58] Field of Search ..................... 210/670, 681, 210/683, 684, 688, 911, 912; 423/510

[56] References Cited

U.S. PATENT DOCUMENTS

| | | | |
|---|---|---|---|
| 4,221,871 | 9/1980 | Meitzner et al. | 521/29 |
| 4,224,415 | 9/1980 | Meitzner et al. | 521/38 |
| 4,256,840 | 3/1981 | Meitzner et al. | 521/33 |
| 4,382,124 | 5/1983 | Meitzner et al. | 521/38 |
| 4,915,928 | 4/1990 | Marcantonio | 423/510 |
| 4,935,146 | 6/1990 | O'Neill et al. | 210/912 |
| 4,971,702 | 11/1990 | Renk | 210/912 |
| 5,264,133 | 11/1993 | Forschner et al. | 210/912 |
| 5,494,582 | 2/1996 | Goodman | 210/683 |
| 5,601,721 | 2/1997 | Lukasiewicz et al. | 210/670 |
| 5,603,838 | 2/1997 | Misra et al. | 210/911 |

OTHER PUBLICATIONS

Reilly $5_{th}$ Edition Product Index (1990).

*Primary Examiner*—Ivars Cinntins
*Attorney, Agent, or Firm*—Welsh & Katz, Ltd.

[57] ABSTRACT

A process for removing contaminating levels of selenium from a contaminated aqueous solution is disclosed. That process includes providing a vessel or flow-permissive container containing a water-insoluble polymeric adsorption medium having a plurality of polymerized $C_1$–$C_4$ N-alkylated pyridinium-containing adsorption sites. An influent of an aqueous solution having a total selenium concentration of about 10 to about 1000 parts per billion is introduced to the vessel or flow-permissive container to contact the insoluble polymeric adsorption medium. The solution is maintained in contact with that insoluble adsorption medium for a time period sufficient for the medium to bind the selenium in the contacting solution. The resulting aqueous solution is discharged from the vessel as an effluent having a total selenium concentration whose ratio to the total selenium concentration of the influent is about zero to about $10^{-3}$.

5 Claims, No Drawings

PROCESS FOR REMOVING SELENIUM FROM SELENIUM-CONTAINING WASTE STREAMS

DESCRIPTION

1. Field of the Invention

This invention pertains to a process for removing an environmentally hazardous contaminant from industrial waste solutions. More particularly, the present invention relates to an efficient affinity process for the selective separation of selenium from selenium-containing waste streams.

2. Background of the Invention

Selenium is commonly found in minerals of copper and molybdenum, and in fossil fuels. Selenium compounds are normally present in petroleum refinery waste streams, waste agricultural and irrigation streams, coal-fired power plant waste streams, coal processing waste streams and copper ore refining waste streams.

The primary industrial source of selenium is the anode muds from electrolytic copper refineries. Selenium is useful for the production of photovoltaic cells, among other things.

Typically, the concentration of selenium in wastewater from the above-named sources is low, i.e., in the 50–1000 parts per billion range (50–1000 micrograms per liter, 0.6–12 micromolar). However, even at these levels, selenium from wastewater has been found to be toxic and teratogenic to certain species of wildlife. Further, even at the analytically small levels described above, selenium compounds present in industrial waste streams have a particularly foul and malodorous property that contributes to poor air quality and the popular resentment directed toward the industrial operations responsible for the waste.

Selenium is found in several oxidation states: negative two (gaseous hydrogen selenide, $H_2Se$; and polyselenide chains, $Se_6^{2-}$), zero (elemental selenium, $Se^0$), plus two (selenium halide, $Se_2X_4$), plus four (selenium dioxide, $SeO_2$; and selenious acid, $H_2SeO_3$) and plus six (selenium trioxide, $SeO_3$; and selenic acid $H_2SeO_4$). The selenium compounds listed above are merely examples commonly associated with that selenium oxidation state.

One ion exchange-type wastewater treatment designed to ameliorate toxic levels of selenide is the method disclosed in U.S. Pat. No. 4,915,928 that involves the treatment of a selenide-contaminated solution with a strong-base anion exchange resin, stripping the selenide from the resin, followed by oxidation of the selenide and the recovery of elemental selenium from the selenium-containing eluate. After the anion exchange resin step, the level of selenium in the treated wastewater can still be as high as about 50 parts per billion (ppb). For example, in FIG. 2 of that patent, when an about 244–393 ppb selenium-containing waste stream was treated with DOWEX® 11 strong-base anion exchange resin, the selenium-depleted wastewater effluent (appearing from about 700–1000 bed volumes) still contained about 45–20 ppb selenium, an objectionable level.

The strong-base anion exchangers disclosed in that patent generally contain tetraalkyl quaternary ammonium functional groups that are aliphatic and acyclic, usually attached to cross-linked polystyrene beads. Commercially available examples are DOWEX® 11 (Dow Chemical Co., Midland, Mich.) and AMBERLITE® IRA 458 (Rohm & Haas, Philadelphia, Pa.). Typically, the anion exchange capacity of those resins is about 3 milliequivalents per gram (dry basis), or 1.0–1.4 milliequivalents per milliliter of resin bed volume (meq/mL). A 1.5 meq/mL resin has a 1.25-fold higher anion binding capacity than a 1.2 meq/mL resin.

Typical ion exchange involves pre-equilibration of an anion exchange column with a low ionic strength buffer, followed by loading the anion-containing solution. The anions of that solution bind to the column due to ion-ion interactions between the anion and the quaternary ammonium cation of the resin. The anions are then eluted from the column with a higher ionic strength buffer that disrupts the anion-resin interaction.

In contrast to ion exchange involving ion—ion interaction, an affinity technique is specific for a certain target and involves a combination of several kinds of interactions. The kinds of known chemical interactions roughly in order from strongest to weakest are covalent bond, coordinate bond, ion—ion (ionic bond), hydrogen bond, dipole-ion, and dipole—dipole interactions.

Selenium is a chalcogen element, considered "soft" due to the marked polarizability of its electron cloud, especially in the selenide state due to the low ionic charge and the large ionic radius. Selenium has a slight propensity to form 6-coordinate compounds.

There remains, therefore, a need for an affordable, practical process for the removal of toxic selenium in any form from selenium-containing waste streams that is both efficient and effective. The description that follows describes one solution to the selenium separation problem.

BRIEF SUMMARY OF THE INVENTION

In accordance with the present invention, selenium can be efficiently and economically removed from an aqueous solution that also contains other ions to levels of less than 5 parts per billion. Further, as described herein, the separation resin can be easily regenerated in the column providing an equally effective regenerated selenium separation medium.

The present invention successfully uses selenium binding to an adsorption medium containing a plurality of $C_1$–$C_4$ N-alkyl pyridinium moieties (groups), and in fact, shows that the adsorption medium has an unexpectedly high affinity for selenium.

A contemplated method for reducing the concentration of selenium in an aqueous solution includes providing a vessel or flow-permissive container containing a water-insoluble adsorption medium having a plurality of pyridyl-containing moieties present as polymerized 2- or 4-vinyl $C_1$–$C_4$ N-alkyl pyridinium moieties, and preferably N-methyl pyridinium moieties as adsorption sites. An influent of an aqueous solution of wastewater having an initial total selenium concentration of about 10 parts per billion to about 1000 parts per billion is introduced to the vessel to contact the insoluble adsorption medium.

The solution is maintained in contact with the insoluble adsorption medium for a period of time sufficient for the adsorption sites to bind to selenium in the influent solution and form medium-bound selenium and an aqueous composition. That aqueous composition is subsequently discharged from the vessel as an effluent having a total selenium concentration whose ratio to the total selenium concentration of the influent is about zero to about $10^{-3}$.

Advantageously, the wastewater contaminated with selenium and subjected to a process described herein is within acceptable parameters for environmental safety with respect to the selenium content. Specifically, the present invention unexpectedly and surprisingly demonstrates that a water-insoluble polymerized $C_1$–$C_4$ N-alkyl pyridinium-containing polymeric resin utilized as a selenium adsorption medium is able to separate selenium from wastewater.

The present invention has several benefits and advantages.

One benefit of the invention is that selenium-contaminated aqueous solutions can be economically treated to provide a solution that is within acceptable environmental safety limits.

An advantage of the invention is that selenium can be substantially completely removed from selenium-containing aqueous solution and recovered for further use.

Another advantage of the invention is that the selenium can be removed with higher efficiency than was previously attainable.

Another benefit of the invention is that the above benefits and advantages can be achieved with readily available materials.

Another advantage of the invention is that its process is very straightforward to carry out and does not require highly specialized equipment.

Yet another benefit of the invention is that the water-insoluble adsorption medium can be reused numerous times without loss of capacity or efficiency.

Still further benefits and advantages of the invention will be apparent to the skilled worker from the disclosure that follows.

DETAILED DESCRIPTION OF THE INVENTION

The present invention is directed to a process for removing contaminating levels of selenium from an aqueous solution also containing other ions. Such a process is used for reducing the level of total selenium from an aqueous solution so that the solution can be disposed of safely or used. The selenium can be recovered therefrom as elemental selenium. It will be recognized by those skilled in the art that the recovery of such commercially usable chemicals is an economically and environmentally sound approach vis-a-vis disposal of the chemicals as waste product.

Unless the term for a specific oxidation state or compound of selenium is used, the use of the term "selenium" herein is intended to encompass any of the forms of selenium present in the waste solution, including all selenium-containing compounds and selenium oxidation states, i.e., minus 2, zero, plus 4 and plus 6. As is known in the art, many unidentified selenium compounds are present in selenium-containing waste streams, and the selenium compounds can change during waste treatment and handling.

Typically, in order to reduce the selenium to environmentally acceptable levels, the total selenium concentration should be at or below 5 parts per billion (ppb). This is about the lowest practicably detectable concentration of selenium.

A process for reducing the concentration of selenium in an a selenium-containing waste stream is thus contemplated. In accordance with that process, a vessel or flow-permissive container is provided that contains a water-insoluble polymeric adsorption medium having a plurality of adsorption sites that are pyridyl-containing moieties present as polymerized 2- or 4-vinyl $C_1$–$C_4$ N-alkyl pyridinium moieties, and preferably as N-methyl pyridinium moieties. An influent of an aqueous solution having an initial total selenium concentration of about 10 parts per billion to about 1000 parts per billion is introduced to the vessel or flows into the container to contact the insoluble adsorption medium. The solution is maintained in contact with the insoluble adsorption medium for a period of time sufficient for the adsorption sites to bind to selenium in the influent solution to form medium-bound selenium and an aqueous composition. That aqueous composition is subsequently discharged from the vessel or flows out of the container as an effluent having a total selenium concentration whose ratio to the total selenium concentration of the influent is about zero to about $10^{-3}$.

The selenium-containing aqueous solution is typically provided from a production waste stream. In a preferred process, the aqueous solution has an initial selenium concentration of about 10 parts per billion to about 1000 parts per billion. Preferably, the effluent stream discharged from the vessel or flowing out of the container has a total selenium concentration of about zero to about 5 parts per billion.

A contemplated polymeric adsorption medium contains a plurality of adsorption sites that are polymerized pyridyl-containing moieties present as polymerized 2- or 4-vinyl $C_1$–$C_4$ N-alkyl pyridinium moieties. Use of polymerized 4-vinyl $C_1$–$C_4$ N-alkyl pyridinium moieties (groups) is preferred. Although $C_1$–$C_4$ alkyl groups such as methyl, ethyl, isopropyl, n-butyl, sec-butyl and the like can be present bonded to the nitrogen of the polymerized pyridinium moiety, N-methyl is a particularly preferred $C_1$–$C_4$ N-alkyl moiety.

A polymeric adsorption medium typically contains at least about 50 mole percent of the polymerized monomers present as $C_1$–$C_4$ N-alkylated pyridinium moieties. Up to about 80 percent of the pyridyl groups can be alkylated, with use of an adsorption medium having about 60 to about 80 percent of the pyridyl nitrogens alkylated being preferred. Thus, the amount of $C_1$–$C_4$ N-alkylated pyridinium moieties can be about 50 to about 80 percent of the polymeric absorption medium.

A contemplated adsorption medium is also insoluble in water. Such water-insolubility can be achieved by co-polymerizing the pyridyl-containing monomer with a cross-linking agent, and also by use of another co-monomer such as styrene or ethyl styrene, as are well known. Divinyl benzene is a preferred cross-linking agent, but other cross-linking agents can also be used as is also well known. The copolymer can then be N-alkylated for use herein.

Water-insoluble beaded and powdered copolymer adsorption media of 4-vinyl pyridine, divinyl benzene and ethyl styrene are commercially available from Reilly Industries, Inc. of Indianapolis, Ind. (Reilly). These media are sold as REILLEX™ 402 (powder; 4-vinyl pyridine, ethyl styrene, divinyl benzene), REILLEX™ 402-I (granules; components as above), REILLEX™ HP (beads; components as above) and REILLEX™ 425 (beads; components as above) each of which can be N-alkylated for use herein. The media also differ in exchange capacity [about 8.8 equivalents/kilogram (eq/kg) to about 4.4 eq/kg] and particle size.

Water-insoluble beaded copolymers of 4-vinyl pyridine, divinyl benzene and ethyl styrene having a preponderance of N-methylated pyridinium residues are commercially available from Reilly as REILLEX™ HPQ (an N-methylated version of REILLEX™ 425; total exchange capacity about 4.6 meq/g dry; i.e., strong and weak ion exchange capacity) and available from NTEC Solutions, Inc. (Mount Prospect, Ill., USA) as PERFIX™ adsorption medium. In these media, approximately 70 percent of the pyridyl residues are N-methylated (about 1–2 molar equivalents of N-methylpyridinium ion per liter of medium). PERFIX™ adsorption medium is especially preferred for use here. Manufacture of a resin (adsorption medium) preferred for use in carrying out the present process is described in U.S. Pat. No. 4,221,871, No. 4,224,415, No. 4,256,840 and No. 4,382,124, whose disclosures are incorporated herein by reference.

In preferred practice, it is contemplated that contact between the selenium-containing aqueous solution and the adsorption medium be carried out in a chromatographic column or flow-through container, such as a perforated plastic or mesh pouch containing adsorption particles, e.g. a "tea bag". As such, the adsorption medium is preferably in the form of beads or particles. It is noted, however, that another physical form such as a liquid, powder, membrane, sheet or other web can also be utilized.

It should be apparent to those skilled in metal ion recovery that a water-insoluble polymeric adsorption medium can be solid or liquid, as noted above. It should also be understood that the $C_1$–$C_4$ N-alkyl pyridinium-containing moieties need not themselves form part of a polymer backbone, but can also be grafted onto a previously made polymer, and then preferably N-alkylated to form an adsorption medium having $C_1$–$C_4$ N-alkyl pyridinium moiety adsorption sites. Thus, for example, a thiol-containing polymer can be reacted with 2- or 4-vinyl pyridine to form polymerized thioethylpyridine groups that can then by N-alkylated with methyl chloride or methyl iodide or the like to form a preferred adsorption medium.

Although other polymerized monomers can be present in a polymerized adsorption medium, such other monomers and the adsorption medium are free of other ionically charged functional groups. Non-alkylated polymerized 2- or 4-vinyl pyridine can be present, however, as is the case with a preferred polymerized adsorption medium.

Contact between the adsorption medium and the aqueous selenium-containing solution is maintained for a time period sufficient for the selenium to be bound by the N-alkyl pyridinium-containing adsorption sites of the medium. That binding is usually quite rapid, with contact times of a few seconds to a few minutes typically being utilized. Much longer contact times such as hours can be utilized with no ill effect being observed.

In one example of the present process, an aqueous solution containing contaminating levels of selenium is introduced into a vessel or flow-permissive container, such as by being pumped through or gravity fed over a chromatographic column containing a preferred adsorption medium [N-methylated poly(4-vinyl pyridinium)] also known as PERFIX™ available from NTEC Solutions, Inc., discussed before. The solution residence time, that is, the time that the solution is maintained in contact with the adsorption medium must be sufficiently long for the N-alkyl pyridinium-containing adsorption sites of adsorption medium to bind the selenium. In the present examples, the solution was maintained in contact with the adsorption medium in the column for about ten seconds. The flow, temperature and pressure constraints of the process are dictated primarily by the limitations of the equipment utilized and the resin used in carrying out the invention. Ambient temperature and pressure are normally used.

Resin-treated effluent is essentially depleted of selenium until the medium adsorption capacity is surpassed. Surpassing the medium adsorption capacity is indicated by either visual observation of the resin color that changes from an off-white color to reddish-brown in the presence of the selenium-containing waste or by analytical testing of the effluent. That is, the preferred PERFIX™ adsorption medium changes color from off-white to reddish-brown upon binding selenium so that a column can be loaded until the resin changes color at the end opposite the input, or loading can continue until selenium assays indicate selenium discharging from the column. A pervasive foul odor from the effluent is another indication of selenium discharging from the column.

When the selenium-removal system was being operated at or below capacity, the amount of selenium remaining in the load effluent (selenium breakthrough) was strikingly low (less than 5 ppb). The selenium binding capacity results were surprising for PERFIX™ (1.5 meq/mL) in comparison to the selenium binding capacity of DOWEX® 11 (1.2 meq/mL). A 1.25-fold enhancement in selenium binding was expected in going from a 1.2 meq/g medium to a 1.5 meq/g medium, whereas a 2-fold enhancement in selenium binding capacity was observed.

Also surprising was the result that the binding efficiency of a selenium affinity resin of the invention is so much better than the selenium binding efficiency of the ion exchange resins of the art. PERFIX™ exhibited a greater than 99 percent selenium binding efficiency, whereas the U.S. Pat. No. 4,915,928 disclosed only an 80–95 percent selenium binding efficiency with the ion exchange resin DOWEX® 11.

It is noted that this observed enhancement in selenium binding capacity and efficiency was quite unexpected.

It is postulated that this surprising enhancement in the selenium binding capacity is a result of ion-dipole or dipole—dipole interactions between the polarizable selenium species and the polarizable $C_1$–$C_4$ N-alkyl pyridinium groups that, together with the ion exchange interaction, gives rise to an enhanced affinity binding interaction with selenium.

The identity of the reddish-brown species observed on binding by the resin is presently unknown, but its elution corresponds to both analytical observation of selenium elution and to the characteristic foul odor. The fact remains that there was no detectable selenium in the effluent, until the selenium was specifically eluted or until the selenium binding capacity was surpassed.

The total amount of selenium-contaminated wastewater that can be processed per cubic foot of a contemplated $C_1$–$C_4$ N-alkylated pyridinium ion-containing adsorption medium such as the preferred PERFIX™ resin is governed by the level of the selenium contamination in the influent (feedstock) wastewater. Unexpectedly, the treated waste effluent exhibited selenium levels that were not detectable by sensitive analytical means such as atomic absorption spectroscopy (less than about 5 ppb).

Also unexpectedly, as discussed herein, it was observed that the adsorption medium could be repeatedly regenerated (e.g., stripped), rinsed and reused, without noticeable physical or chemical degradation of the selenium binding capacity of the resin. The PERFIX™ resin that was used can withstand operational pressures of 100 psi and temperatures of 100 degrees Celsius.

A contemplated process successfully removes selenium from selenium-contaminated aqueous waste solutions at temperatures between about 15° C. and 90° C. Preferably, the process is operated at temperatures between about 20° C. and 70° C.

The present process successfully removes selenium from an aqueous solution in a pH range from acidic to about neutral (about pH 1 to about pH 7). Preferably, the process is operated with a solution having a pH value between about 4 and 7, and most preferably, between about 6 and 7. At pH values above about 7, the process begins to lose efficiency and at a pH value of about 14 (e.g., addition of 2.0N NaOH), the selenium binding to the adsorption medium is much less efficient.

The process effectively reduces selenium contaminants from waste streams having initial selenium concentrations of about 10 to about 1000 ppb, and has been observed to reduce the selenium concentrations thereof to about less than 5 ppb, and more particularly down to concentrations between about zero and 5 ppb.

It was also observed that the adsorption medium could be regenerated and reused a number of times. Regeneration of the adsorption medium is preferably accomplished without removing the adsorption medium from the column or flow-through container.

The adsorption medium (resin) can be regenerated by methods well-known in the art. For example, the affinity interaction can be broken by mass action treatment of the resin with base as is well-known in the art, for example an aqueous 1–2 normal (N) sodium hydroxide or other strong base solution. The ion-dipole or dipole—dipole interaction can be broken by treatment of the resin with a moderately nonpolar organic solution, such as acetone, in conjunction with a strong acid solution such as aqueous 1–2N hydrochloric acid solution. The resin is then washed with water to remove excess acid and counterions, completing the regeneration.

The resin can be used, stripped and regenerated and can be used in multiple cycles without measurable loss in binding capacity or increase in back pressures during operation. Generally, increases in back pressure indicate physical degradation of the adsorption medium.

BEST MODE FOR CARRYING OUT THE INVENTION

EXAMPLE 1

Removal of Selenium From Wastewater Using a $C_1$–$C_4$ N-Alkylated Pyridium Adsorption Medium Preparation of Resin Approximately 300 mL of N-methylated poly (4-vinyl pyridyl) bead resin having about 70 percent N-methylation, sold under the name PERFIX™ as available commercially from NTEC Solutions, Inc. of Mount Prospect, Ill. USA, were slurried with approximately 600 mL of deionized water. This resin has a particle size in the 18–50 mesh size, and has an exchange capacity of about 3.4 meq/g dry as a strong base and a total exchange capacity of about 4.6 meq/g dry as both a strong and a weak base. The spherical beads were allowed to settle. After about one minute, the colored supernatant was decanted and discarded along with small resin particles, or fines, which did not settle during the first minute. This operation was repeated until the supernatant was colorless and free of fines (5 to 6 cycles of slurry and decantation). This operation was further repeated using 0.1N sodium hydroxide place of deionized water, followed by washing with 10 percent acetic acid in water and 4 to 5 additional slurry and decantation cycles with deionized water.

The resin slurry was then charged to a 25×500 mm glass column having a porous fritted glass support and a bottom stopcock until the column contained 200 mL of settled bed volume occupied with resin.

Introduction of Selenium-Containing Wastewater Into the Resin Bed

Thirty (30) liters of a wastewater solution of "sour water" from a petroleum refinery contaminated with about 600 parts per billion selenium had a pH value of about 2. The wastewater solution was used as supplied, without additional treatment. The solution was continuously added to the column until the entire solution sample was introduced into and contacted with the resin bed. As the solution was introduced into the resin bed, the color of the resin at the top of the column turned a reddish dark brown from its original off-white color. As additional wastewater solution flowed down into the column, the band of color slowly extended down the column until approximately 10 percent of the resin bed had been utilized, whereas the unused resin at the bottom of the column remained essentially off-white.

It was observed that washing the column with deionized water did not result in migration of the reddish dark brown band. It was also observed that selenium was not detected in the column effluent using atomic absorption analysis, nor by its characteristic odor, so that less than about 5 ppb were present.

The capacity of the resin was determined by measuring the length of the reddish dark brown band that formed in the column upon the binding of selenium to the resin, and comparing the colored length to the total length of the resin bed. The capacity of the resin was determined to be approximately 25 grams of selenium (as metal) per cubic foot ($ft^3$) of resin, whereas U.S. Pat. No. 4,915,928 that utilized DOWEX® 11 strong-base anion exchange resin, reported a selenium capacity in stripped sour water effluent of about 13 grams/$ft^3$ of resin. Furthermore, use of the DOWEX® 11 resin provided an average selenium concentration of about 26 ppb in the effluent, whereas use of a resin contemplated herein resulted in no detectable selenium (less than about 5 ppb) in the effluent.

Regeneration of the Resin Bed

The resin column was regenerated using a solution of 1.0N NaOH. The solution was prepared, and 2 column volumes thereof were passed through the column containing the bound selenium. After treatment of the column with NaOH solution, the column was rinsed with two column volumes of deionized water. A solution of 1:9 acid:acetone was prepared using 1.0N $H_2SO_4$ solution, and was run through the column, followed by two more column volumes of deionized water. The combination of solutions completely removed the bound selenium from the resin.

It was unexpected that the adsorption medium would exhibit highly efficient binding capacity for selenium amounting to a selenium affinity interaction. The use of the N-methylated poly(4-vinyl pyridine) (PERFIX™) adsorption medium to remove selenium from wastewater showed that substantially all of the selenium could be removed from the wastewater solution with an unexpectedly enhanced selenium binding capacity relative to strong-base anion exchange resins, suggesting another interaction in addition to the strong-base anion exchange interaction between the resin and the selenium.

The observation of enhanced affinity for selenium by the anion exchange resin was unexpected. The observed column capacity was higher for the resin containing N-alkyl pyridinium functional groups than expected for DOWEX® 11, a strong-base anion exchange resin not containing an aromatic functional group.

Whereas the selenium sorption in known processes was expected to be enhanced 1.25-fold over a strong-base anion exchange resin such as DOWEX® 11, the present process exhibited a 2.00-fold enhancement in selenium binding capacity from the wastewater stream. In fact, given that the treated wastewater (effluent) selenium contamination levels of the present process are between about zero ppb and 5 ppb, the ratio here of the total selenium concentration of the effluent to the influent is about zero to about 0.008 (0 ppb/600 ppb to 5 ppb/600 ppb, respectively).

Not wishing to be bound by this mechanism, it is postulated that the highly polarizable selenium is interacting with the highly polarizable $C_1$–$C_4$ N-alkyl pyridinium pi-electron cloud, resulting in a dipole—dipole interaction in addition to the expected ion—ion interaction between the anion and the anion-exchange resin. This hypothesis is supported by the red-brown color observed, which may be a result of an interaction between the selenium electron cloud and a pyridinium pi-electron cloud.

It will be recognized by those skilled in the art that the present process can be carried out in both a batch mode and in a continuous, steady state mode. In such a steady state mode, the contact or residence time of the solution with the adsorption medium must be sufficiently long to permit the N-alkyl pyridinium-containing adsorption sites of the adsorption medium to bind to the selenium. It will also be recognized by those skilled in the art that various methods of regenerating the resin can be used, and that the method of regeneration presented herein is illustrative only and should not be considered to limit the scope of the invention to the regeneration method herein.

EXAMPLE 2

Removal of Selenium From Wastewater Using a Non-N-Alkylated Pyridyl Resin

A beaded resin having approximately 5.5 meq/g of polymerized 4-vinyl pyridine incorporated as an integral component of its polymeric backbone was evaluated with respect to its selenium removal efficiency from petroleum wastewater streams. Unlike the beaded resin of Example 1, the pyridyl moieties of this resin are non-alkylated. This beaded resin containing non-alkylated pyridyl groups is commercially available from Reilly Industries (Indianapolis, Ind., USA) under the trade name of REILLEX™ HP Polymer. Approximately 100 mL of REILLEX™ HP Polymer beads were washed and de-fined by sequentially slurrying and decanting from 500 mL volumes of water, 1N NaOH, water, 1N $H_2SO_4$, water, 1N NaOH, water, 10% acetic acid and finally water. The resulting resin beads (50 mL) were added to a chromatographic column (2.2 cm×120 cm) equipped with a bottom porous frit and stopcock valve. The prepared resin occupied the lower 13 cm of the column bed. Water was permitted to flow through the column until the water level was approximately 1 cm over the resin bed.

Wastewater containing 790 ppb of selenium was added to the top of the column and permitted to flow through the column until 5 column volumes (250 mL) had been collected in order to displace the starting volume of water originally present. The eluate of the initial 5 column volumes was discarded. An additional 20 column volumes (1000 mL) were passed through the column, pooled and collected. As in the previous example with the preferred resin of this invention, a reddish-brown band formed at the top of the resin bed as wastewater was applied. Analysis of the pooled column volumes 5–25 revealed a 25 percent (about 200 ppb) reduction in selenium content compared to the untreated wastewater.

This example demonstrates that the level of selenium binding efficiency for REILLEX™ HP Polymer is too low to be of practical utility. This example also demonstrates that there is a measurable contribution for selenium binding donated by the non-alkylated pyridyl residues of REILLEX™ HP Polymer. It is therefore believed that the enhanced binding (affinity) between selenium species found in the wastewater and the $C_1$–$C_4$ N-alkylated pyridinium-containing resin is most likely in part the result of the pyridinium pi-electrons interacting with the selenium species.

From the foregoing, it will be observed that numerous modifications and variations can be effectuated without departing from the true spirit and scope of the novel concepts of the present invention. It is to be understood that no limitation with respect to the specific example presented is intended or should be inferred. The disclosure is intended to cover by the appended claims all such modifications as fall within the scope of the claims.

What is claimed is:

1. A process for removing selenium in an aqueous solution comprising the steps of:

（a) providing a flow-permissive container containing a water-insoluble polymeric adsorption medium having a plurality of adsorption sites that are pyridyl-containing moieties present as polymerized $C_1$–$C_4$ N-alkyl pyridinium moieties;

(b) introducing an influent aqueous solution having an initial total selenium concentration of about 10 to about 1000 parts per billion to the flow-permissive container to contact the insoluble adsorption medium;

(c) maintaining said solution in contact with said insoluble medium for a time period sufficient for said selenium in the influent to bind to said adsorption sites to form medium-bound selenium and an aqueous composition; and (d) discharging the aqueous composition from the flow-permissive container as an effluent having a total selenium concentration whose ratio to the total selenium concentration of the influent is about zero to about $10^{-3}$.

2. The process in accordance with claim 1 wherein said polymerized $C_1$–$C_4$ N-alkyl pyridinium moieties constitute about 50 to about 80 mole percent of the polymeric adsorption medium.

3. A process for removing selenium in an aqueous wastewater solution comprising the steps of:

(a) providing a flow-permissive container containing a water-insoluble polymeric adsorption medium having about 50 to about 80 mole percent polymerized $C_1$–$C_4$ N-alkyl pyridinium moieties as adsorption sites;

(b) introducing an influent of an aqueous solution of selenium-contaminated wastewater having an initial total selenium concentration of about 10 to about 1000 parts per billion to the flow-permissive container to contact the adsorption sites;

(c) maintaining said solution in contact with said adsorption medium for a time period sufficient for said adsorption sites to bind to selenium in the influent to form medium-bound selenium and an aqueous composition; and (d) discharging said aqueous composition from the flow-permissive container as an effluent having a total selenium concentration of about zero to about 5 parts per billion.

4. The process in accordance with claim 3 wherein said $C_1$–$C_4$ N-alkyl pyridinium moieties of said polymeric absorption medium are N-methyl pyridinium moieties.

5. The process in accordance with claim 3 including the further steps of removing selenium from said polymeric adsorption medium by contacting said medium with an aqueous solution of a strong base, maintaining said contact for a time period sufficient to form a selenium-containing aqueous solution, and recovering said selenium-containing aqueous solution.

* * * * *